March 8, 1949.  W. H. BANCROFT  2,463,938
PLANT SETTING DEVICE
Filed Jan. 31, 1947  2 Sheets-Sheet 1
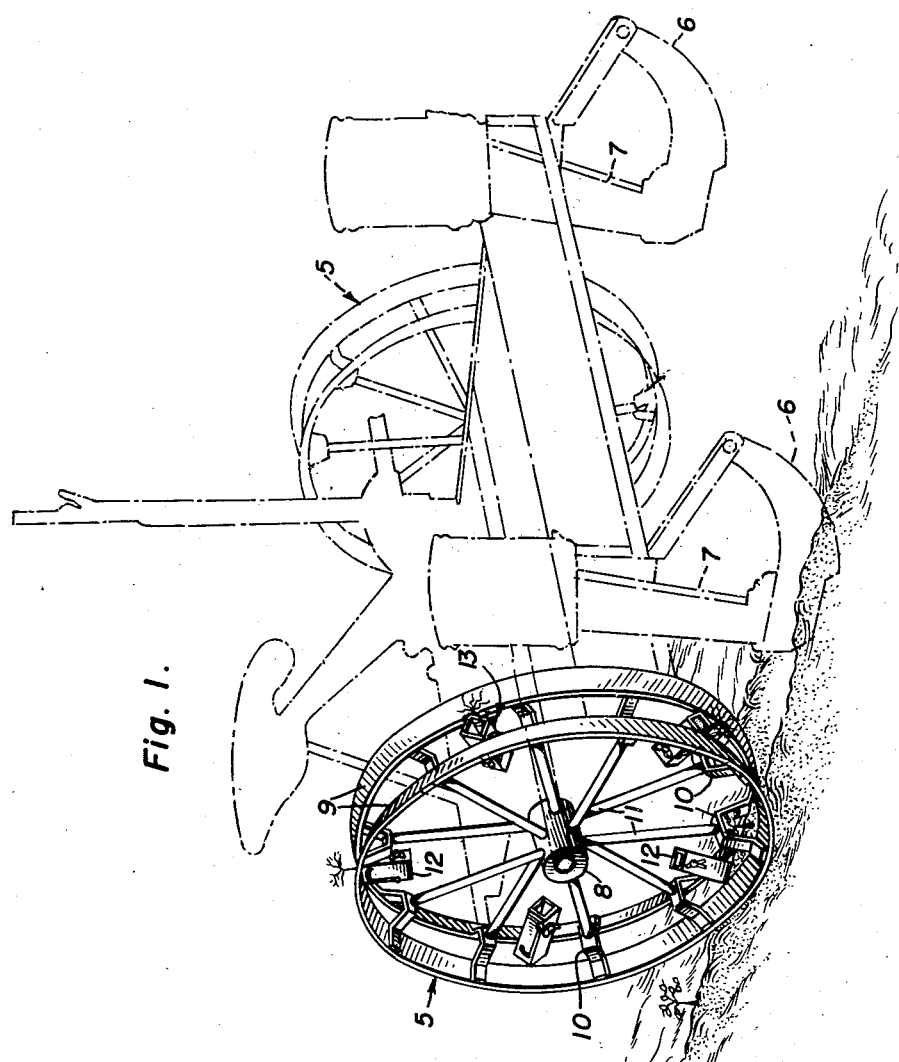
Fig. I.
Inventor
Warren H. Bancroft
By *Clarence A. O'Brien
and Harvey B. Jacobson*
Attorneys March 8, 1949. W. H. BANCROFT 2,463,938
PLANT SETTING DEVICE
Filed Jan. 31, 1947 2 Sheets-Sheet 2
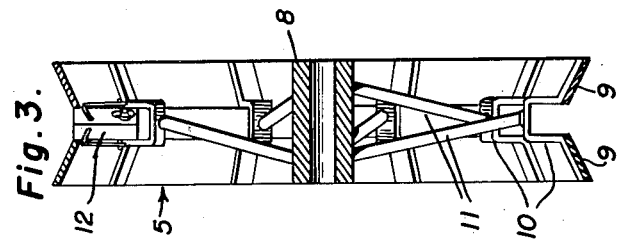
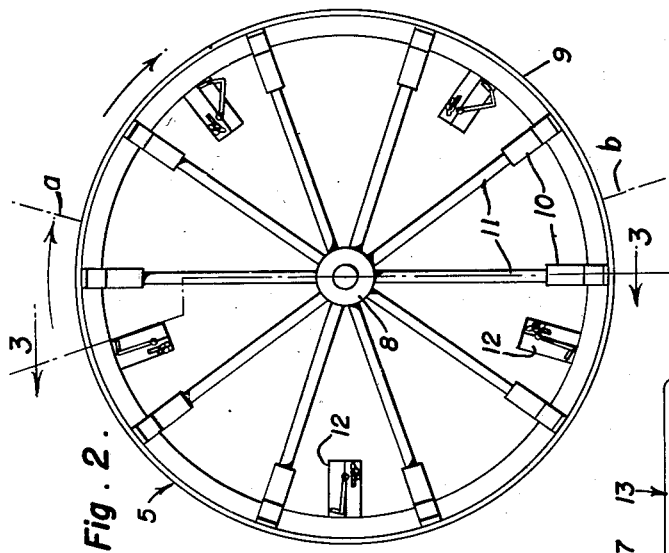
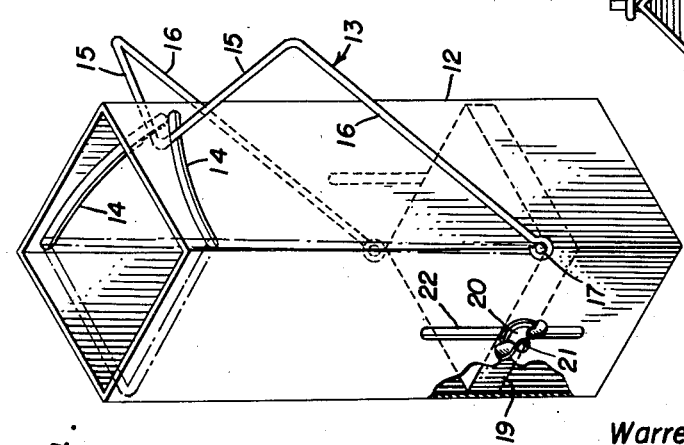
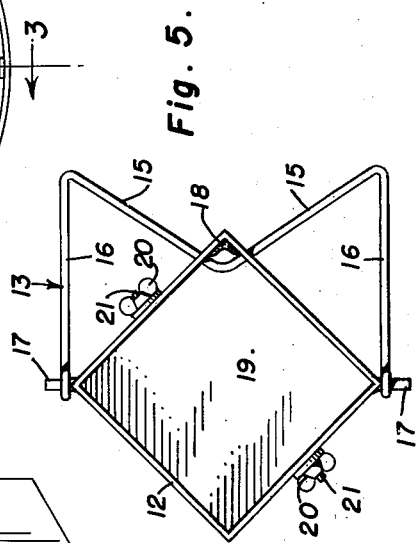
Inventor
Warren H. Bancroft
By Clarence A. O'Brien
and Harvey B. Jacobson
Attorneys Patented Mar. 8, 1949

2,463,938

UNITED STATES PATENT OFFICE 2,463,938

PLANT SETTING DEVICE

Warren H. Bancroft, Kilbourne, La.

Application January 31, 1947, Serial No. 725,477

5 Claims. (Cl. 111—2)

This invention relates to transplanting machines, and particularly to a novel and improved device for setting plants in a furrow, and then packing the earth about the roots of the plants.

An object of the invention is to provide a device of the above kind embodying a supporting and covering wheel provided with plant receiving buckets, and means actuated by gravity to retain the plants in the buckets until they are carried to planting position, and to then release the plants and effect deposit of the same in a previously made furrow.

Another object is to provide a device of the above kind by means of which the plants are successively carried to planting position and deposited in the furrow, and wherein the supporting and covering wheel promptly packs the earth around the roots of each plant as soon as it is deposited to effectively set and retain the plant in a proper upright position.

A further object is to provide each bucket with a readily adjustable bottom to adapt the bucket for use in connection with plants of different heights.

A still further object of the invention is to provide a plant setting device in which no mechanical actuating means is required to effect gripping and release of the plants.

Yet another object of the invention is to provide a plant setting device which is comparatively simple in construction and efficient in operation.

The exact nature of the present invention will become apparent from the following description when considered in connection with the accompanying drawings, in which:

Figure 1 is a perspective view, partly diagrammatic, illustrating one supporting and covering wheel of a two row corn planter modified to provide a plant setting device constructed in accordance with the present invention;

Figure 2 is a side elevational view of the device shown in Figure 1;

Figure 3 is a section taken on line 3—3 of Figure 2;

Figure 4 is an enlarged perspective view of one of the plant receiving buckets; and Figure 5 is a top plan view of the bucket shown in Figure 4.

Referring in detail to the drawings, 5 indicates a supporting and covering wheel such as is commonly employed on corn planters. As is usual in this type of planter, a furrow opener 6 operates in advance of each supporting and covering wheel. This furrow opener is carried by the boot 7 of a seeding mechanism which deposits the seeds in the furrow in advance of the associated wheel 5, and the latter then covers the deposited seeds. When the wheel 5 is modified to provide the present plant setting device, the seeding mechanism is rendered inoperative, the furrow opener 6 being used to form the furrow for reception of the plants, and the wheel 5 being utilized to pack the earth about the roots of the plants. However, while the present invention is illustrated as adapted to a corn planter, it is obvious that the device may be provided with a special frame in which the wheel in journaled and which carries a suitable furrow opener in advance of the wheel.

As shown, the wheel 5 includes a hub 8, and a pair of outwardly diverging rims 9 which are rigidly connected to the hub by spoke means in spaced parallel relation and concentric with the hub. The spoke means includes U-shaped saddles 10 rigidly connecting the rims, and spokes 11 rigidly connecting the saddles 10 with the hub 8.

In accordance with the present invention, a plurality of plant receiving buckets 12 are fixed within and disposed radially of the wheel 5 in uniformly spaced relation. These buckets have open outer ends which communicate with the space between the rims 9. Thus, the buckets are peripherally arranged within the wheel, and they are preferably welded or otherwise rigidly attached to the rims at the inner edges of the latter. If found desirable or necessary, suitable braces may be provided between each bucket and adjacent spokes of the wheel. A freely movable clamping element 13 is carried by each bucket, and such element is movable by gravity to clamping position for retaining a plant in the bucket, approximately at the point indicated at a in Figure 2 or immediately after the bucket starts to move forwardly and downwardly during rotation of the wheel. Also, the clamping element is movable by gravity to a released position for depositing the plant in the furrow at approximately the point indicated at b in Figure 2, or immediately before the bucket starts to move rearwardly and upwardly during rotation of the wheel. Due to the arrangement and form of the element 13, it is over-balanced in the proper direction to bring about this operation.

Each bucket 12 includes a body having arcuate elongated slots in the upper portion thereof. The clamping element 13 comprises a member having legs 15 which freely extend outwardly through the slots 14 and terminate in substantially right angular extensions 16 which are connected by pivots 17 to the outside of the bucket body near the bottom of the latter, the slots 14 being concentric with the pivots 17. Each bucket is preferably of elongated and rectangular form as shown, the slots 14 being provided in adjacent sides of the bucket and the pivots 17 being located at opposite corners of the bucket. Also, the member 15, 15 is preferably of substantially V-shape so that the stalk of the plant is clamped between a corner of the bucket and the clamping member 15, 15 at the juncture of the legs of the latter when said clamping member is in its clamping position as shown in Figures 4 and 5. A suitable cushion 18 may be secured in this corner of the bucket to prevent mutilation of the clamped plant. When the clamping member moves away from this corner of the bucket, the plant is released so that it may pass freely out of the bucket.

The bucket 12 has a separate bottom 19 which is adjustable to vary the effective depth of the bucket. For this purpose, the bottom is adjustable longitudinally of the bucket body and may be clamped in adjusted position by means of clamping nuts 20 threaded on bolts 21 fixed to and projecting from opposite sides of the bottom 19 through longitudinal elongated slots 22 provided in opposite sides of the bucket body.

In operation, as the transplanting machine moves ahead, the wheel 5 is caused to turn in the direction of the arrow shown in Figure 2. As the buckets successively move rearwardly and upwardly from the point b, the clamping elements 13 gravitate to released position as indicated by dotted lines in Figure 4. As the buckets successively approach the top of the wheel, the operator deposits a plant in each bucket with the roots outermost or uppermost as shown in Figure 1. Continued rotation of the wheel 5 causes the buckets to successively pass the point a in moving forwardly and downwardly. At this point a, the clamping elements gravitate to the clamping position shown by full lines in Figures 4 and 5 and shown at the right side of the wheel in Figure 2. When this occurs, the plants are clamped and retained in the buckets, being held between the intermediate portion of the members composed of legs 15 and the corners of the bucket bodies provided with the cushions 18. In this way, the plants are successively carried down to the planting position or point b of Figure 2, whereupon the plants are released by gravitation of the clamping elements to released position. Thus, the plants are successively deposited in the furrow previously formed by the associated furrow opener 6, the roots of the plants being thereafter immediately covered with dirt by means of the wheel rims 9 which pack the earth around the roots and leave the plants firmly set in an upright position in the ground. The buckets will readily withdraw from the set plant without damaging the latter, as said buckets move rearwardly and upwardly upon continued rotation of the wheel.

From the foregoing description, it is believed that the construction, operation and advantages of the present invention will be readily understood and appreciated by those skilled in the art. Modifications and changes in details of construction are contemplated, such as fall within the scope of the invention as claimed.

What I claim is:

1. The combination with a supporting and covering wheel including a pair of outwardly diverging rims rigidly connected in spaced parallel relation, plant receiving buckets fixed within and disposed radially of said wheel in uniformly spaced relation, said buckets having open outer ends communicating with the space between the said rims, and a freely movable clamping element carried by each bucket, said clamping element being movable by gravity to clamping position for retaining a plant in the bucket immediately after the latter starts to move forwardly and downwardly during rotation of the wheel and to released position for depositing the plant in a furrow immediately before the bucket starts to move rearwardly and upwardly during such rotation.

2. The construction defined in claim 1, wherein each bucket has a bottom wall adjustable to vary the depth of the bucket.

3. The construction defined in claim 1, wherein each bucket includes a body having arcuate elongated slots in the upper portion thereof, said clamping member comprising a part having legs freely extending outwardly through said slots and terminating in substantially right angular extensions connected by pivots to the outside of the body near the bottom of the latter, said slots being concentric with said pivots.

4. The construction defined in claim 1, wherein each bucket includes a rectangular body having arcuate elongated slots in the upper portions of adjacent sides thereof, said clamping element including a V-shaped part having its legs freely extended outwardly through said slots and terminating in substantially right angular extensions connected by pivots to the outside of the body at opposite corners and near the bottom of the latter, said slots being concentric with said pivots.

5. In a plant setting device, a plant receiving and depositing bucket comprising a body having arcuate elongated slots in the upper portion thereof, and freely movable clamping elements carried by said bucket and movable by gravity to clamping position and to released position when the bucket is moved in a vertical circular path so as to receive a plant near the top of said path and to deposit the plant near the bottom of the path, said clamping element comprising a part having legs freely extending outwardly through said slots and terminating in substantially right angular extensions connected by pivots to the outside of the body near the bottom of the latter, said slots being concentric with said pivots.

WARREN H. BANCROFT.

REFERENCES CITED

The following references are of record in the file of this patent:

UNITED STATES PATENTS

| Number | Name | Date |
| --- | --- | --- |
| 72,525 | Moran | Dec. 24, 1867 |
| 2,372,739 | Renault | Apr. 3, 1945 |

FOREIGN PATENTS

| Number | Country | Date |
| --- | --- | --- |
| 511,065 | Germany | Nov. 1, 1930 |